Figure 1:
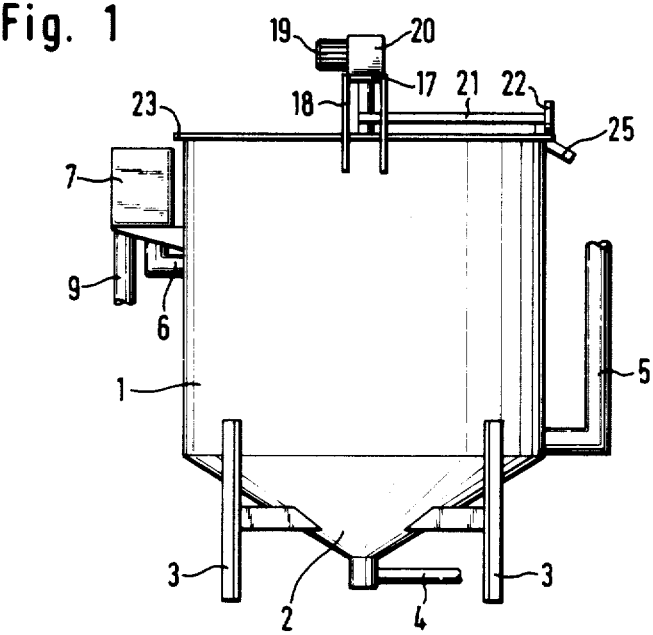

United States Patent [19]

Stigebrandt

[11] Patent Number: 4,492,635

[45] Date of Patent: Jan. 8, 1985

[54] DEVICE FOR SEPARATING SOLID SUBSTANCES FROM LIQUIDS

[76] Inventor: Åke Stigebrandt, Nygatan 30, Marstrand, Sweden

[21] Appl. No.: 532,529

[22] Filed: Sep. 15, 1983

[30] Foreign Application Priority Data

Sep. 20, 1982 [SE] Sweden .............................. 8205380

[51] Int. Cl.³ ............................................. B01D 21/02
[52] U.S. Cl. .................................... 210/519; 210/521; 210/533; 210/537; 209/158; 209/210
[58] Field of Search ............... 210/519, 521, 532.1, 210/533, 537, 538; 209/158, 160, 168, 170, 210

[56] References Cited

U.S. PATENT DOCUMENTS

| | | | |
|---|---|---|---|
| 1,793,510 | 2/1931 | Raymond | 210/519 |
| 1,851,172 | 3/1932 | Gordon | 210/538 X |
| 2,793,186 | 5/1957 | Dunnell et al. | 210/521 |
| 3,794,167 | 2/1974 | Olgard et al. | 210/519 |
| 3,933,654 | 1/1976 | Middelbeek | 210/521 |
| 4,123,365 | 10/1978 | Middelbeek | 210/521 |

*Primary Examiner*—Ivars Cintins
*Assistant Examiner*—W. Gary Jones

[57] ABSTRACT

Device for the separation of substances contained in a liquid, when such substances exhibit a density, which is close to the density of the liquid, the device preferably being used for the extraction of fat and protein matters from process water in the food industry.

By in vertical direction accelerating and the flow of a liquid containing particles with higher or lower density than the liquid, in which the particles are suspended, and at the same time change the direction of flow, particles heavier than the suspending liquid can settle on the bottom of a vessel (1), from where they can be drawn off, and particles lighter than the suspending liquid are collected on the surface, from where they can be removed by for example skimming.

The acceleration and retardation are brought about by changes of areas in a vessel with a guided flow and where the direction of flow, which is substantially vertical, is turned by about 180° at several occasions.

4 Claims, 8 Drawing Figures

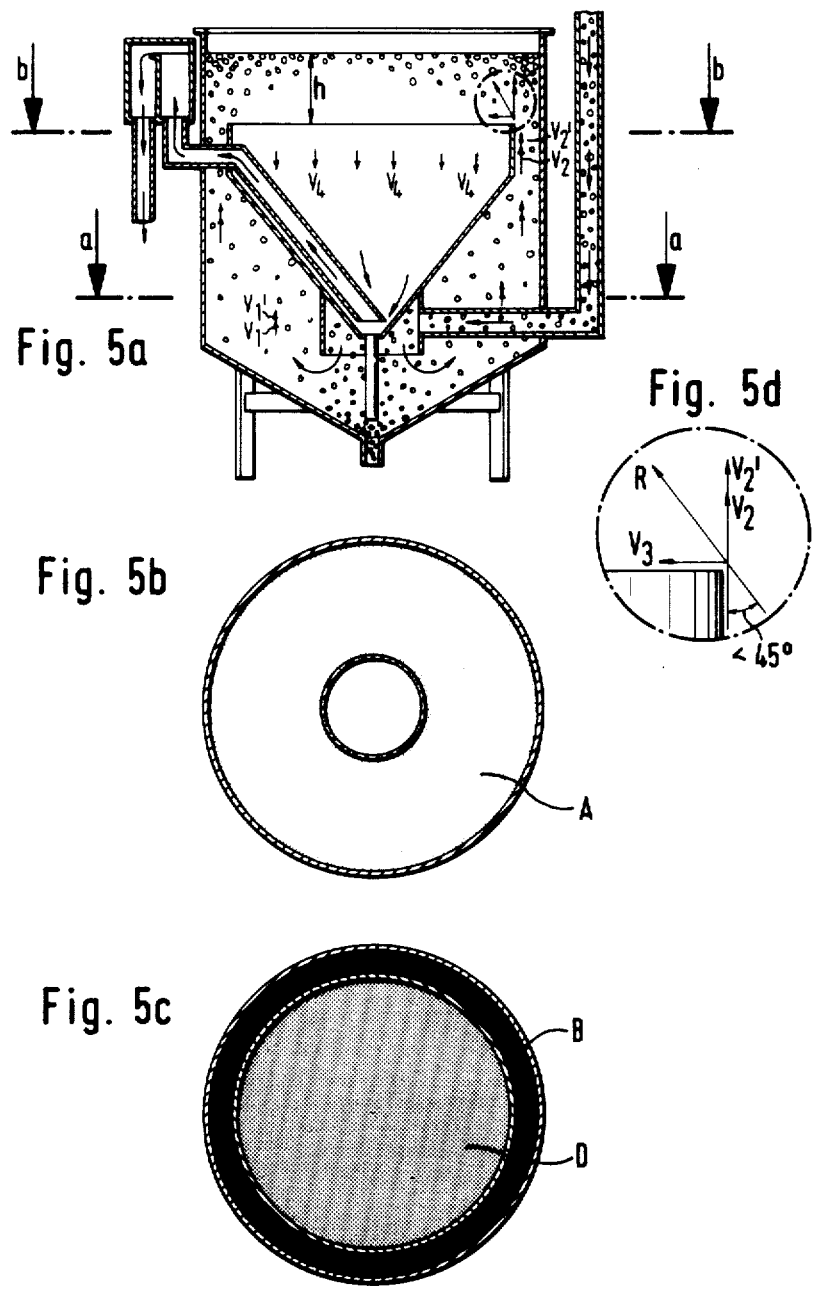

DEVICE FOR SEPARATING SOLID SUBSTANCES FROM LIQUIDS

Great quantities of water are often used in processes in the food industry, such water in many cases containing considerable quantities of fats and fat related matter and proteins and protein related matter.

The present device is in the first place related to the removal of such matter from the process water in the fish processing industry, but it can also be used in other food processing industries and in other operations, where liquid substances and matter of differing density and poor solubility in each other are treated.

Grease separators of conventional type are only in exceptional cases capable of reducing the fat content of the water to an acceptable level. When the reduction of fat content is low, it follows that also the reduction of bacteriological oxygen consumption in the water is low. It is a characteristic feature of the common grease separators of the prior art that one works with a substantially horizontal movement of the water through the grease separator, the particles to be separated from the water getting a vertical gradient of speed only because of the difference in its density in relation to the density of water. The smaller the difference of density the lower will the vertical gradient of speed of the particle be, and the harder it will be for the particle to settle out on the surface or on the bottom.

It is a principal object of the invention to remove these drawbacks and to provide the possibility of an efficient separation also in cases, where the differences in density are very small. The characteristics of the invention are evident from the following description.

The device according to the embodiment of the invention illustrated in the drawings comprises a grease separator, that works in such a way that the movement of the water in the separator is substantially vertical, the direction at 3 different occasions being turned by 180°. By this arrangement the heavy particles are accelerated towards the bottom and the light particles towards the surface. The heavy particles can then be drained off through a bottom faucet and the light particles and liquids be collected on the surface, from which they can be drained or skimmed off.

The device has been subjected to a thorough appraisement in the fish processing industry. The initial quantities of grease that can be settled out and the ultimate quantities of removable grease that can be settled out have been measured at a great many occasions and at different loads. The degree of separation was very high, in fact 90% at loads above 5 m/h. As a consequence of the high separation of grease the reduction of biochemical oxygen consumption and material in suspension is also very high.

Figure 2:
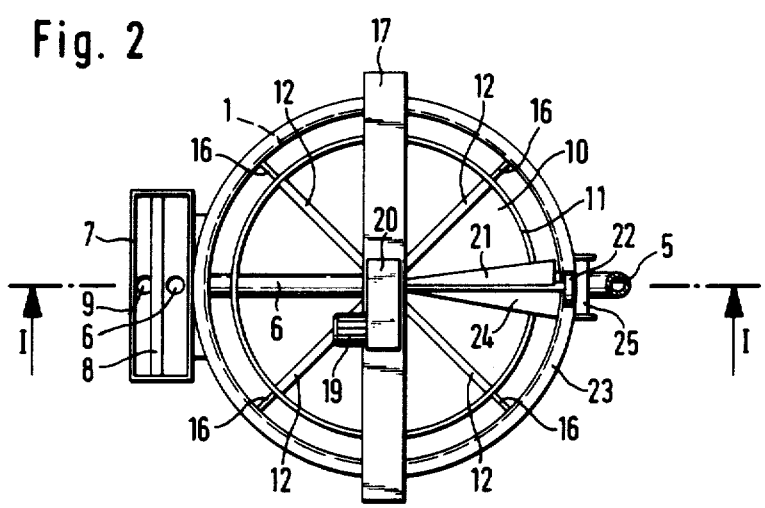
Figure 3:
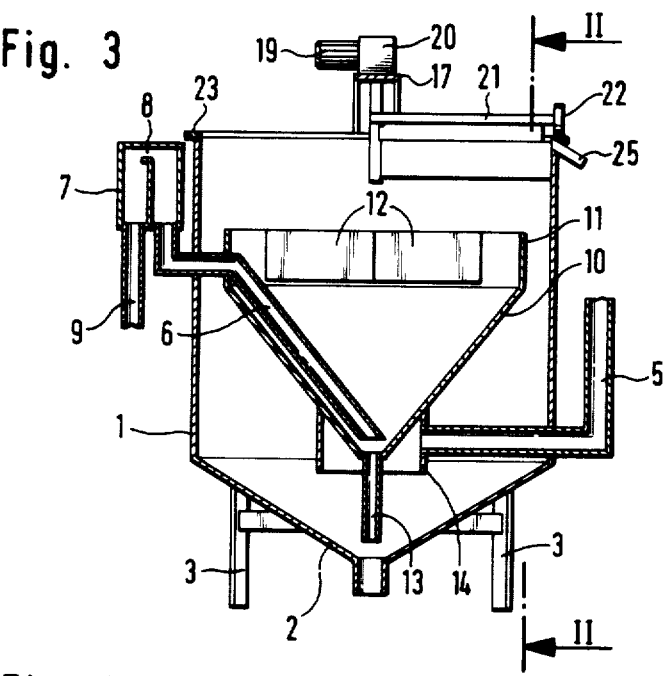
Figure 4:
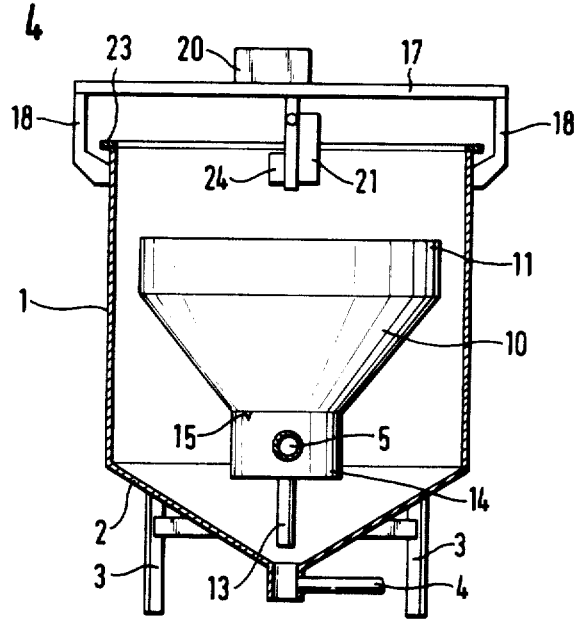

The device will now be described more in detail, reference being made to the accompanying drawings, in which FIG. 1 is a side-elevational view of a device made according to the invention and seen from the side, FIG. 2 is a top view of the same device, FIG. 3 is a schematical vertical cross-sectional view through the device along the line I—I in FIG. 2, FIG. 4 is a schematical vertical cross-sectional view through the device along the line II—II in FIG. 3, FIG. 5a is a vertical cross-sectional view corresponding to the one FIG. 3 and showing the path of flow through the device, FIG. 5b is a schematical view showing the outer area of flow in the cross-section a—a in FIG. 5a, FIG. 5c is a schematical view showing the areas of flow in the cross-section b—b in FIG. 5a, and FIG. 5d shows the direction of flow of the medium at the transition section between the two areas of through flow B and D in FIG. 5c.

The device illustrated in the drawings comprises a vessel 1 with a conical bottom wall portion 2, the apex of the cone facing downwards. In the embodiment illustrated in the figures the device is provided with legs 3. A tube is mounted on the downwardly projecting apex of the cone. The gradient of the wall 2 of the cone is designed in such a manner that sediment settling in the vessel slides downwards towards the apex of the cone, from where it can be drained off through the duct 4. An inlet duct 5 is connected with the receptacle and an outlet duct 6 leads from the same to an outlet well 7. The outlet well 7 is provided with weir 8. When the water has passed the weir 8, it is collected and discharged via the duct 9 to a receptacle or to be subjected to further treatment.

An inverted conical receptacle 10 is mounted inside the vessel 1 The gradient of the conical wall is designed in such a manner that any sediment settling in the cone will slide downwards to the apex of the cone. The top of the receptacle 10 is provided with an annular rim 11, which increases its height, said receptacle being open at the top Partitions 12 of angular setting are mounted in the rim 11. The partions serve the purpose to prevent rotation of the water contained in the cone 10. The base of the cone is provided with a tube 13, which extends down towards the bottom of the outer vessel 1. The water contained in the cone 10 is drained off through this tube in connection with the discharge of the device. The tube 13 is designed in such a manner that any substantial transportation of water does not take place through the same during the operation of the device. The cone 10 is provided at its base with an annular 14, which is mounted on the outer mantle surface of the cone. A supply duct 5 is connected with the ring 14 or disigned in such a manner that its orifice is surrounded by the ring 14. The ring 14 is provided with one or several slits 15 (FIG. 4). Any air that may be brought along with the inlet water is drawn off via the slit arrangement 15.

The cone 10 is suspended in the vessel 1 via connecting means 16 (FIG. 2). These connecting means are disigned in such a manner that they check the rotation of the water in the vessel 1.

A slusher is mounted at the top of the vessel 1. In the ambodiment illustrated this slusher comprises a beam 17, which is mounted on brackets 18. A driving motor 19 and a reduction gear means 20 for the reduction of speed is mounted on the beam. The slusher 21 is connected with the reduction gear means. The slusher includes a wheel 22 riding on the uppermost portion of the vessel 1, which on its top side is provided with a rim 23, against which the wheel 22 is arranged to run. The slusher works against a dolly 24 (FIG. 4), over which the slusher is folded during its passage. The mass of material collected by the slusher is pressed out of the vessel 1 via holes in the mantle and the drainage channel 25.

The plant described above is preferably made in cylindrical shape, but it can also be designed in square, rectangular or other shape. The plant can also be designed to stand on the ground or be accommodated in the ground.

The plant functions in the following manner:

The liquid, which shall be subjected to treatment, is supplied to the plant via the inlet duct 5. The inlet duct directs the feed inside the ring 14, which means that the liquid is forced downwards in the manner illustrated in FIG. 5. Heavy particles, i.e. particles of a density exceeding the density of the liquid, are than accelerated towards the bottom of the vessel. The flow of liquid is thereafter deflected by approx. 180°, and the speed of the individual particles of liquid is reduced reaching their lowest speed in the area represented by the cross-section a—a in FIG. 5, where the effective area in the vessel as A. The rising speed of the liquid in this cross-section is $v_1 = Q/A$, where Q is the symbol for the flow. From this cross-section the liquid as well as the particles contained in the liquid and having a density that is lower than the one of the surrounding liquid rise in upwards direction. The particles with a density that is lower than the one of the surrounding liquid rise to the surface more quickly than the surrounding particles of liquid, and the speed of these particles is indicated with $v_1'$.

In the cross-section b—b the sectional area B between the inner mantle surface of the vessel 1 and the outer mantle surface of the ring 11 is smaller than A, and on account thereof the speed $v_2$ of the liquid flow in the cross-section b—b is greater than $v_1$ in the cross-section a—a. The speed $v_2'$ of those particles, which are lighter than the liquid, is higher than the speed $v_2$ of the surrounding liquid. Provided that the flow is kept within the laminar layer both $v_2$ and $v_2'$ are directed upwards.

Between the upper edge of the ring 11 and the surface of the water the distance is h. The smallest value of the distance h is fixed by the overflow 8. The liquid flowing through the plant shall pass over the circumference of the ring through the sectional area C, which is equal to the circumference of the ring 11 multiplied by the height h.

The speed in the cross-section C is indicated with $v_3$ and is Q/C.

When the liquid has passed through the section C, the flow is guided towards the bottom of the cone, where the drainage duct is located. The direction of flow is thus again turned by 180°. The liquid shall then pass the base of the cone 10 and the inside of the ring 11, which according to the cross-section b-b has the interior area D. The speed is indicated with $v_4$ and is Q/D.

At the bottom of the cone the direction of flow is once more turned by 180°, and the water is discharged out of the plant via the outlet pipe 6.

As is evident from the above, the liquid and the lighter particles are accelerated from the speed $v_1$ and $v_2$ respectively as well as $v_1'$ and $v_2'$ respectively in the cross-sections a—a and b—b respectively. When a particle of lower density than the one of the liquid just leaves the sectional area B, it is subjected to a gradient of speed in horizontal towards the centre of the vessel, which means that the speed resultant R of the particle deviates from the vertical direction it has had in the section b—b. Provided that the sectional area C is as great or greater than the sectional area B, the direction of movement of the particle at the point immediately above the edge of the ring will have a gradient that is smaller than 45° in relation to the vertical plane, as the speed $v_2$ is greater than or equal to the speed $v_3$ and the real particle speed in the section b—b is $v_2'$, which is greater than $v_2$, i.e. $v_2'$ is greater than $v_3$. If moreover the section D is greater than or equal to the section C, a particle, which is lighter than the surrounding liquid, will move in direction towards the surface in the vessel.

Because of the fact that the particle has this direction of movement, it is leaving the section D, and the gradient of speed towards the opening of the drainage pipe 6 is reduced the greater the distance will be between the opening of the drainage pipe above the bottom of the cone 10 and the individual particle. In order to avoid that particles are drawn downwards in the cone, the angle between the opening of the drainage pipe in the centre line of the vessel and the upper edge of the ring 11 shall be equal to or less than 45°.

The above theoretical exposition is related to laminar conditions, but it has turned out that the function is maintained also in case the speeds are greater than the theoretically calculated laminar condition of flow. The possible degree of excess of speed of the laminar flow substantially depends upon the degree of difference of dencity between the particles and the medium, in which they are suspended and upon the size of the particles.

I claim:

1. In a device for separating solid substances from a liquid, said substances having a density close to that of said liquid, particularly adapted for the extraction of fatty and protein-like substances from food processing water, and having a vessel provided at the top thereof with means for removal of solid substances collected on the surface of said liquid and at the bottom thereof with means for removal of settled residue, the improvement comprising an outer vessel, the lower portion of which is shaped in the form of an inverted cone, the apex of which is provided with means for discharging settled residue therefrom; an inner inverted conical receptacle concentrically disposed within said outer vessel and spaced from the bottom thereof, said inner receptacle being provided at the bottom thereof with means for discharging liquid downwardly from the apex of said inner receptacle near the discharge means of said outer vessel, the uppermost portion of said inner receptacle being open and provided with angularly spaced vertical partitions to impede rotary flow of liquid within said inner receptacle; inlet duct means for feed extending through said outer vessel and terminating near the base of said inner receptacle; an outlet duct for liquids extending from about the inside of the base of said inner receptacle, along the side wall thereof, through said inner receptacle and outer vessel and terminating at about the base of a chamber disposed outside of said outer vessel near the top thereof, said chamber having an overflow weir separating liquid introduced thereinto from liquid discharged therefrom, the height of said weir determining the level of liquid in said outer vessel; a duct for removing excess liquid overflowing said weir; and means for removing solid substances from the top of said outer vessel; whereby liquid introduced into the device is caused to flow upwardly along the outer surface of said inner receptacle and downwardly along the inner surface thereof to said outlet duct for liquids.

2. A device according to claim 1, wherein the lower portion of said inner receptacle is provided with a substantially cylindrical chamber depending from and surrounding the lower apex formed by the cone of said receptacle and being open on the bottom thereof, said inlet duct means is connected to said cylindrical chamber.

3. A device according to claim 2, wherein said cylindrical chamber is provided with openings near the juncture of said cylindrical chamber and inner receptacle to facilitate discharge of air introduced in said inlet duct means.

4. A device according to claim 2, wherein said inner receptacle is provided at the bottom thereof with a discharge duct depending downwardly therefrom and extending to near the discharge means of said outer vessel.

* * * * *